ABSTRACT OF THE DISCLOSURE

This invention relates to maleimide compounds. More particularly, the invention relates to antibacterial compounds of the formula (I)

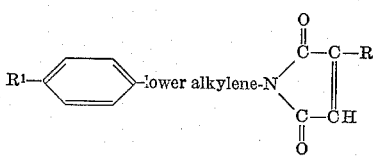

wherein R is hydrogen or lower alkyl, and $R^1$ is hydroxy, lower alkoxy, carboxy, lower alkanoyloxy, —NH-lower alkanoyl and

---

This application is a continuation-in-part of application Ser. No. 395,910, filed Sept. 11, 1964, now abandoned.

In the new compounds of Formula I, the lower alkyl groups include straight and branched chain hydrocarbon groups such as methyl, ethyl, propyl, isopropyl, butyl, isobutyl, t-butyl, amyl and the like. The lower alkoxy groups are ether groups containing the same kind of alkyl group linked to the oxygen. The lower alkanoyl groups are the acyl radicals of straight and branched chain lower fatty acids with two to seven carbon atoms in the acyl group, e.g., acetyl, propionyl, butyryl, isobutyryl and the like. The lower alkanoyloxy groups contain the same type of acyl moiety.

The new compounds of this invention are produced by reacting the appropriately substituted phenylalkyl amine, e.g., an amine of the formula (II)

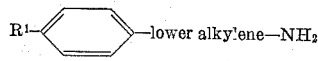

with maleic anhydride or R-substituted maleic anhydride, and the maleamic acid which is the product of this reaction is cyclized, for example, with acetic anhydride and sodium acetate at an elevated temperature in the range of about 70 to 100° C. Certain of these products, particularly those with carboxy groups, form salts with alkali metals, alkaline earth metals and with organic bases such as pyridine, ethanolamine, etc.

The compounds of this invention are useful as antibacterial agents, e.g., to combat organisms such as *Staphylococcus aureus, Proteus vulgaris, Escherischia coli, Salmonella schottmuelleri* and *Mycobacterium tuberculosis*. They may be administered orally or parenterally in daily dosages of about 10 to 120 mg. in conventional forms. The compound itself or a physiologically acceptable basic salt thereof is combined with a conventional pharmaceutical carrier, including excipient, lubricant, buffer, etc., according to accepted pharmaceutical practice. In this manner, tablets, capsules, elixirs, injectables and the like for oral or parenteral use are provided. Disinfectant solutions may be prepared in conventional vehicles.

The follow examples are illustrative of the invention. Temperatures are expressed on the centigrade scale.

Example 1

To 9.8 gm. of maleic anhydride in 100 ml. of glacial acetic acid are added dropwise a solution of 13.7 gm. of tyramine in 50 ml. of dimethylformamide with stirring in an ice bath. The mixture is stirred for one hour at room temperature. The N-(p-hydroxyphenethyl)maleamic acid formed is then precipitated from one liter of ether.

To 23.4 gm. of N-(p-hydroxyphenethyl)maleamic acid are added 200 ml. of acetic anhydride and 8 gm. of anhydrous sodium acetate and the mixture is heated with stirring over a steam bath for one hour. The reaction mixture is cooled and the sodium acetate is filtered off. 750 ml. of ether are added to the filtrate and then petroleum ether (boiling range 30–60°) is added to incipient crystallization. This is then cooled and filtered to obtain the product, N-(p-acetoxyphenethyl)maleimide.

Example 2

The product of Example 1 is converted to N-(p-hydroxyphenethyl)maleimide by methanolysis with sulfuric acid in methanol, M.P. 174–176°.

Example 3

By substituting p-methoxyphenethylamine for the tyramine in the procedure of Example 1, N-(p-methoxyphenethyl)maleamic acid and N-(p-methoxyphenethyl)maleimide, respectively, are obtained.

Example 4

By utilizing 3-hydroxytyramine as the starting material and proceeding as in Example 1, N-(3-dihydroxyphenethyl)maleamic acid, N - (3,4 - diacetoxyphenethyl)maleimide and N-(3,4-dihydroxyphenethyl)maleimide, respectively, are obtained.

Similarly, by utilizing other substituted phenylalkylamines as starting materials, other compounds of this invention are obtained.

Example 5

A solution of infusion is prepared by dissolving 30 mg. of N-(p-acetoxyphenethyl)maleimide and 50 mg. of heparin in 1000 ml. of 5% glucose-water.

What is claimed is:
1. A compound of the formula

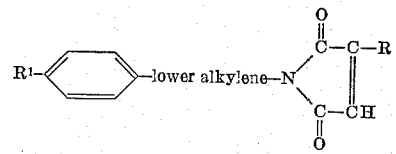

wherein R is a member of the group consisting of hydrogen and lower alkyl, and $R^1$ is a member of the group consisting of hydroxy, lower alkoxy, carboxy, lower alkanoyloxy, —NH-lower alkanoyl and

said lower alkanoyl and lower alkanoyloxy groups having two to seven carbon atoms.

2. A compound of the formula
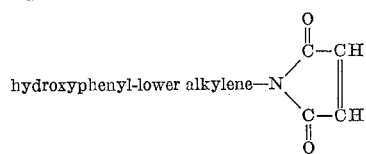
3. N-(p-acetoxyphenethyl)maleimide.
4. N-(p-hydroxyphenethyl)maleimide.
References Cited
UNITED STATES PATENTS
| | | | |
|---|---|---|---|
| 2,743,260 | 4/1956 | Tawney | 260—78 |
| 2,790,787 | 4/1957 | Tawney | 260—65 |
| 3,211,747 | 10/1965 | Johnson | 260—326.3 |
ALEX MAZEL, *Primary Examiner.*
J. A. NARCAVAGE, *Assistant Examiner.*